Aug. 10, 1943.   E. G. BAILEY ET AL   2,326,513
STEAM GENERATOR
Filed Aug. 2, 1941   5 Sheets-Sheet 4

INVENTORS
Arthur E. Raynor
& Ervin G. Bailey
BY
Joseph P Moran Attorney

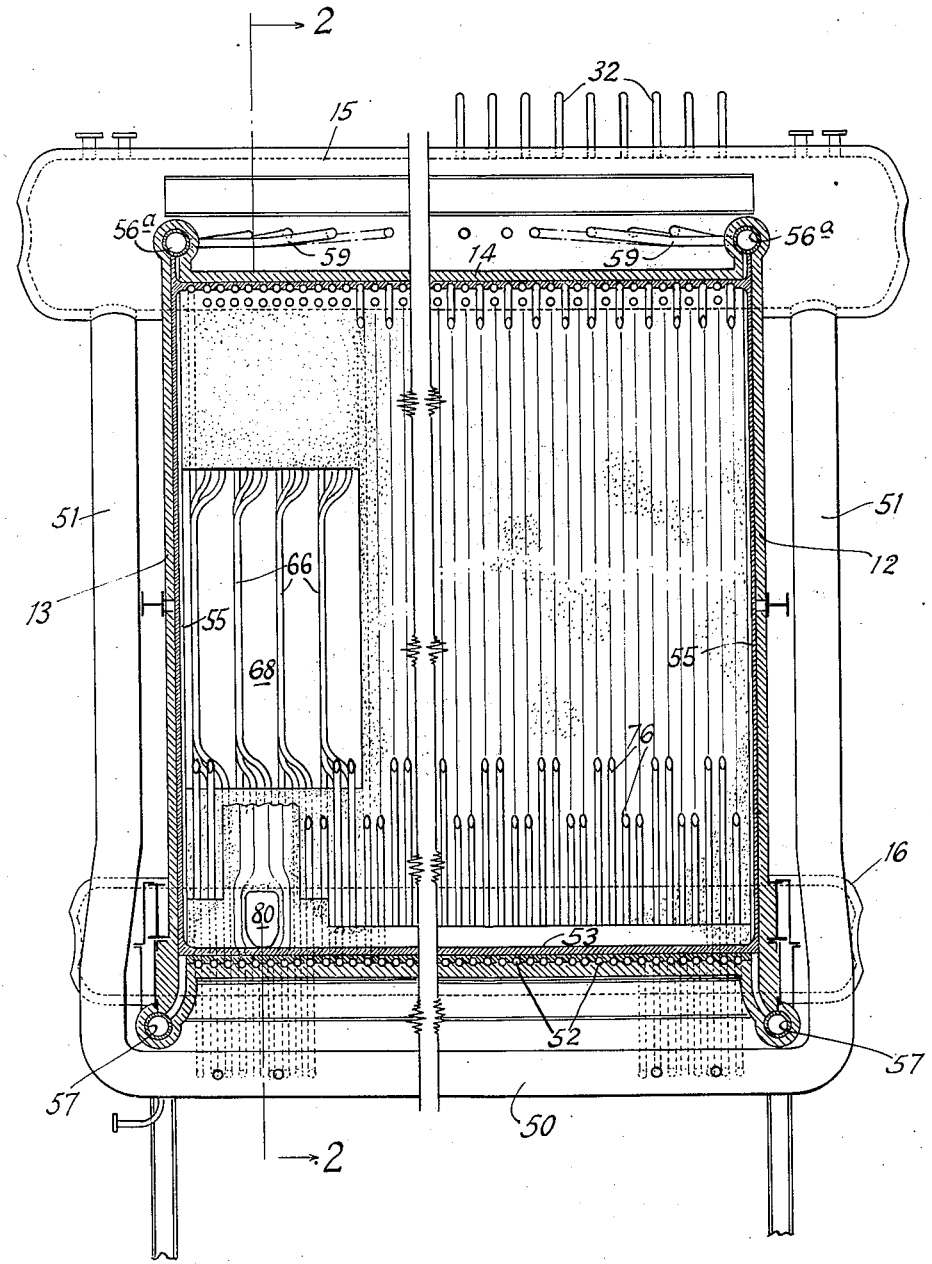

Patented Aug. 10, 1943

2,326,513

UNITED STATES PATENT OFFICE 2,326,513

STEAM GENERATOR

Ervin G. Bailey, Easton, Pa., and Arthur E. Raynor, Rockville Centre, N. Y., assignor to The Babcock & Wilcox Company, Newark, N. J., a corporation of New Jersey Application August 2, 1941, Serial No. 405,182

10 Claims. (Cl. 122—336)

The present invention relates to the construction and operation of vapor generating units, and particularly to water tube steam generators of the "integral furnace" type.

The main object of our invention is the provision of a water tube steam generator of the "integral furnace" type which is particularly characterized by its high steam generating capacity in relation to the space occupied. A further object is the provision of a steam generator of the character described which is particularly adapted and especially designed for burning pulverized slag-forming fuels having a low ash fusion temperature at relatively high rates of heat release without danger of fouling the steam generating and superheating surface.

The various features of novelty which characterize our invention are pointed out with particularity in the claims annexed to and forming a part of this specification. For a better understanding of the invention, its operating advantages and specific objects attained by its use, reference should be had to the accompanying drawings and descriptive matter in which we have illustrated and described a preferred embodiment of our invention.

Of the drawings:

Fig. 5 is a view similar to Fig. 4 taken on the line 5—5 of Fig. 1.

Figure 3:
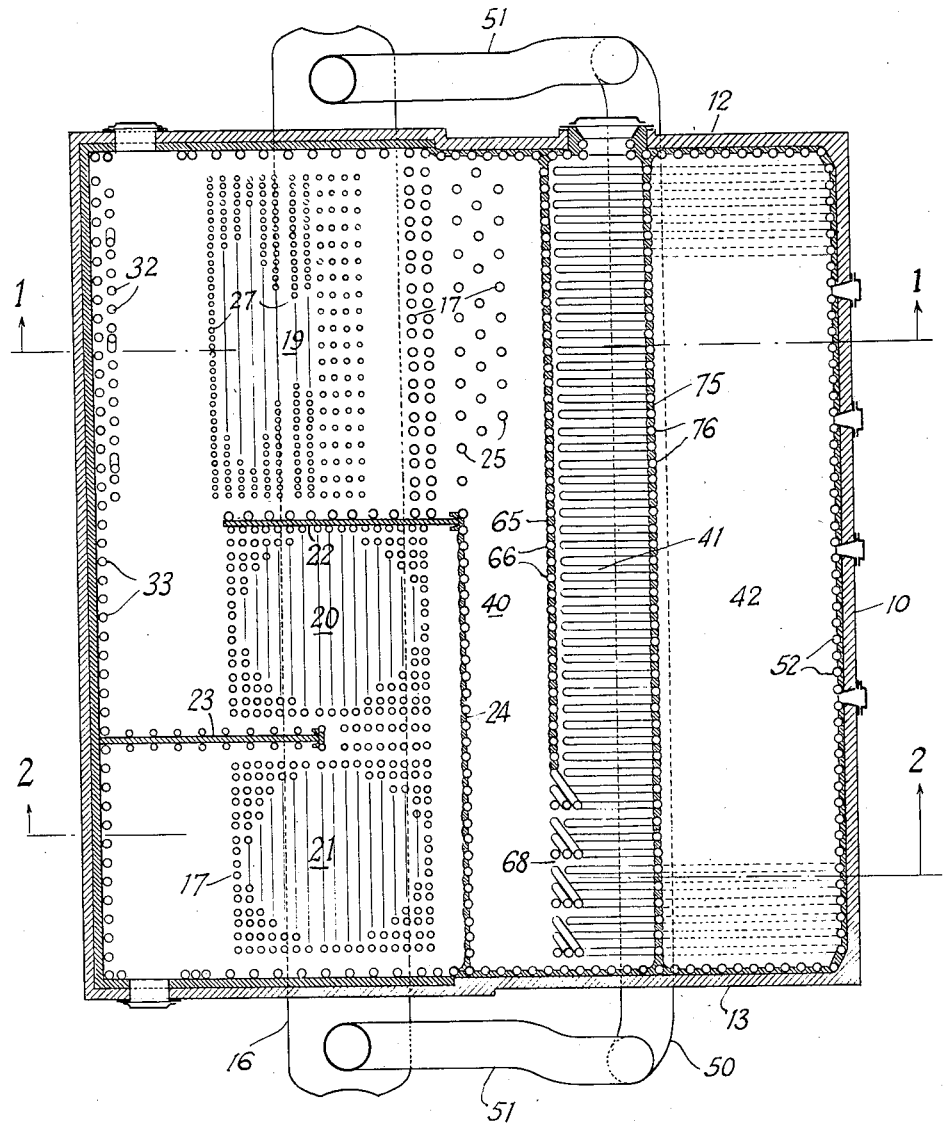
Fig. 3 is a horizontal section taken on the line 3—3 of Fig. 1.

The steam generating unit illustrated in the drawings has a setting defined by walls including a front wall 10, a rear wall 11, side walls 12 and 13, and a roof 14 arranged to define a setting of substantially square horizontal cross-section. The rear half of the setting is occupied by a convection heated boiler section of the general character shown in the prior patent of applicant Bailey et al. No. 1,999,984. In the present construction however, a horizontally arranged upper steam and water drum 15 has its longitudinal axis in vertical alignment with the axis of a horizontally arranged lower water drum 16, a vertical bank of steam generating tubes 17 being connected into the drums at opposite sides of the longitudinal center lines thereof. The setting space occupied by the convection heated boiler section is divided into a plurality of serially connected gas passes 19, 20, and 21 by vertically arranged transverse baffles 22 and 23, positioned as shown in Fig. 3 relative to a water cooled partition 24 which extends longitudinally of the setting from the wall 13 to the inner end of the baffle 22. The inner rows of steam generating tubes across the entrance end of the gas pass 19 are widely spaced to form a tube screen 25 across the entrance.

Figure 1:
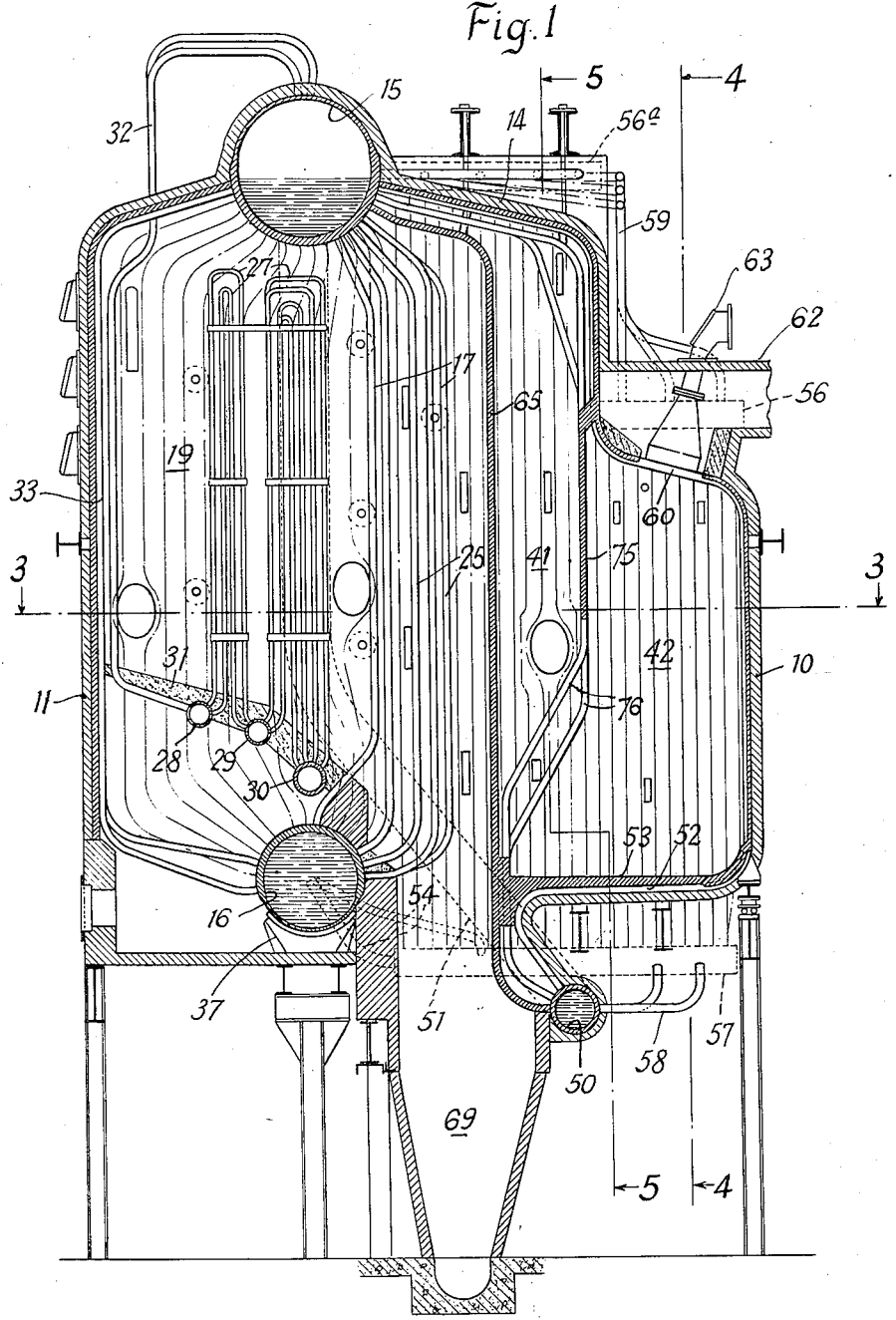
Fig. 1 is a sectional elevation of a preferred form of steam generating unit embodying the invention, taken on the line 1—1 of Fig. 3.

The main portion of the gas pass 19 is occupied by groups of small diameter inverted U-shaped steam superheating tubes 27 connected to a steam inlet header 28, an intermediate header 29, and steam outlet header 30, as shown in Fig. 1. A baffle 31 extends upwardly and rearwardly from the drum 16 across the superheater headers to the rear wall 11. A row of steam supply tubes 32 extending along the rear wall 11 connects the drum 15 to the superheater inlet header 28. The rear wall is further protected by a row of water tubes 33 connecting the drums 15 and 16. The gas pass 21 opens at its upper rear side into a gas outlet duct 35. The portions of the tubes 33 extending across the duct 35 are bent so as to correspondingly increase the effective gas flow area thereacross. The boiler section described thus contains a relatively large amount of convection heated steam generating and superheating surface compactly arranged in the rear half of the setting, with the tubes and baffles relatively arranged to form gas turning spaces minimizing the gas pressure drop through this section. The relative arrangement of the drums and the tubes connected thereto also facilitates the bottom support of this entire section on supporting cradles 37 below the drum 16.

The remaining portion of the setting is occupied by a furnace section laterally adjoining the convection heated boiler section. The steam generating capacity of the unit is substantially increased by the incorporation of a large amount of steam generating surface heated mainly by radiation in the furnace section, this surface being formed by partitions incorporating steam generating tubes and arranged to form a pair of substantially unobstructed narrow elongated parallel gas flow passes 40 and 41 serially connecting a main furnace chamber 42 and the entrance end of the gas pass 19. All of the walls defining the sides of the furnace chamber 42 and gas passes 40 and 41 are water cooled by rows of water tubes, receiving their water supply from the water space of the drum 15 and discharging the steam generated therein into the steam space of the drum 15. The water cooled wall provisions comprise a supply header 50 below the furnace chamber and receiving its water supply from the water space of the upper drum through external downcomer pipes 51 at opposite sides of the unit. A row of tubes 52 extends upwardly from the header 50 along the floor 53 of the main furnace chamber and upwardly along the front wall 10 and stepped roof 14. The construction illustrated is especially designed for the burning of a pulverized slag-forming fuel having a low ash fusion temperature, the floor of the chamber 42 being formed by blocks and refractory covering the corresponding portions of the tubes 52 to form a closed furnace chamber bottom adapted to receive and support a layer of molten slag thereon. The side wall portions of the furnace chamber 42 and open passes 40 and 41 are cooled by a row of tubes 55 extending between top and bottom headers 56 and 57 respectively, each header 57 being connected to the supply header 50 by supply pipes 58, and each header 56 being connected to an intermediate portion of the drum 15 by riser tubes 59. The headers 57 are also connected to the lower drum 16 by pipes 54. As shown in Fig. 5, the upper ends of the tubes 55 defining the sides of the open passes are connected to headers 56a at a higher elevation than the headers 56, and similarly connected to the upper drum.

Figure 2:
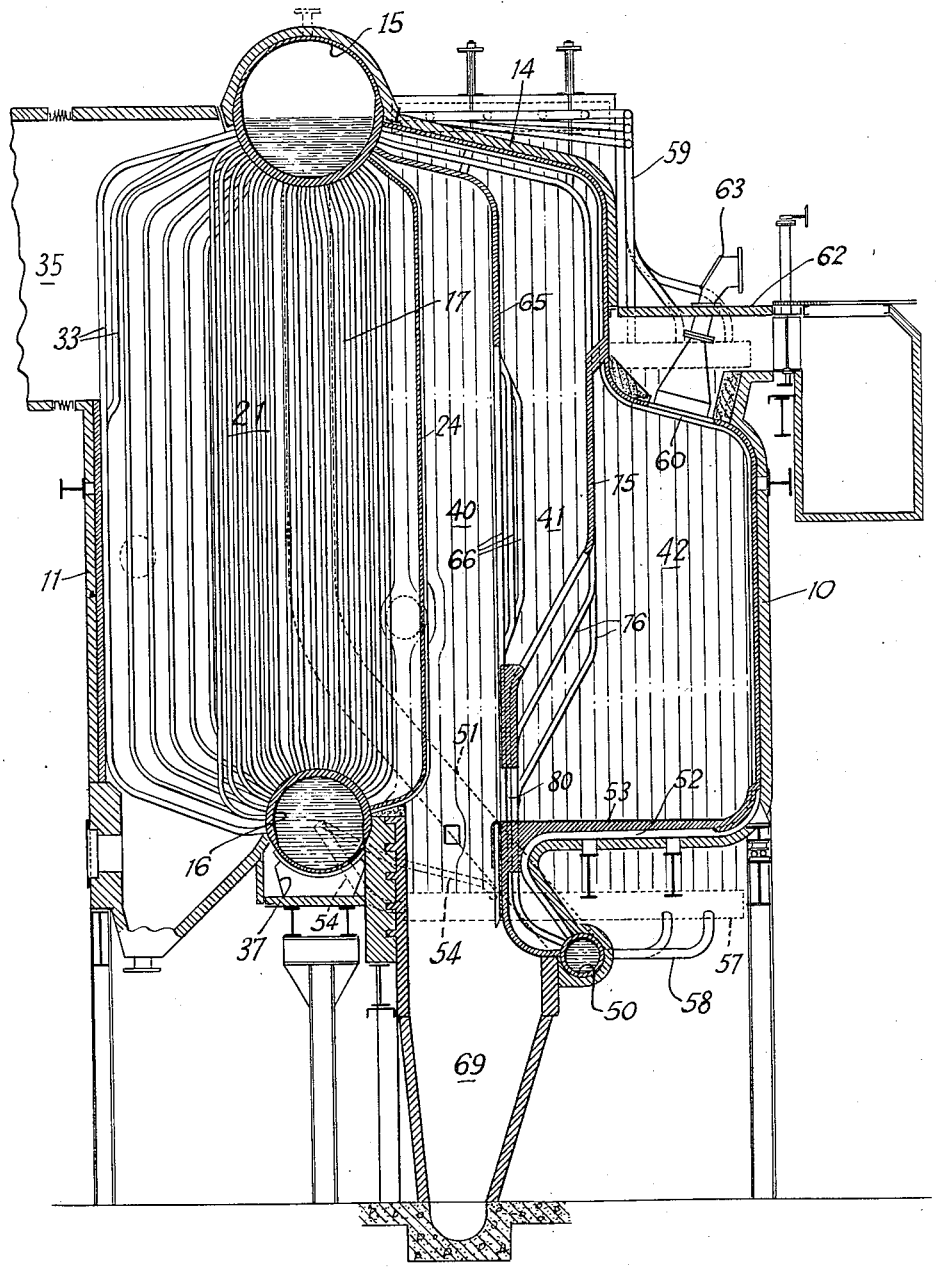
Fig. 2 is a view similar to Fig. 1 taken on the line 2—2 of Figs. 3 and 5.
Figure 4:
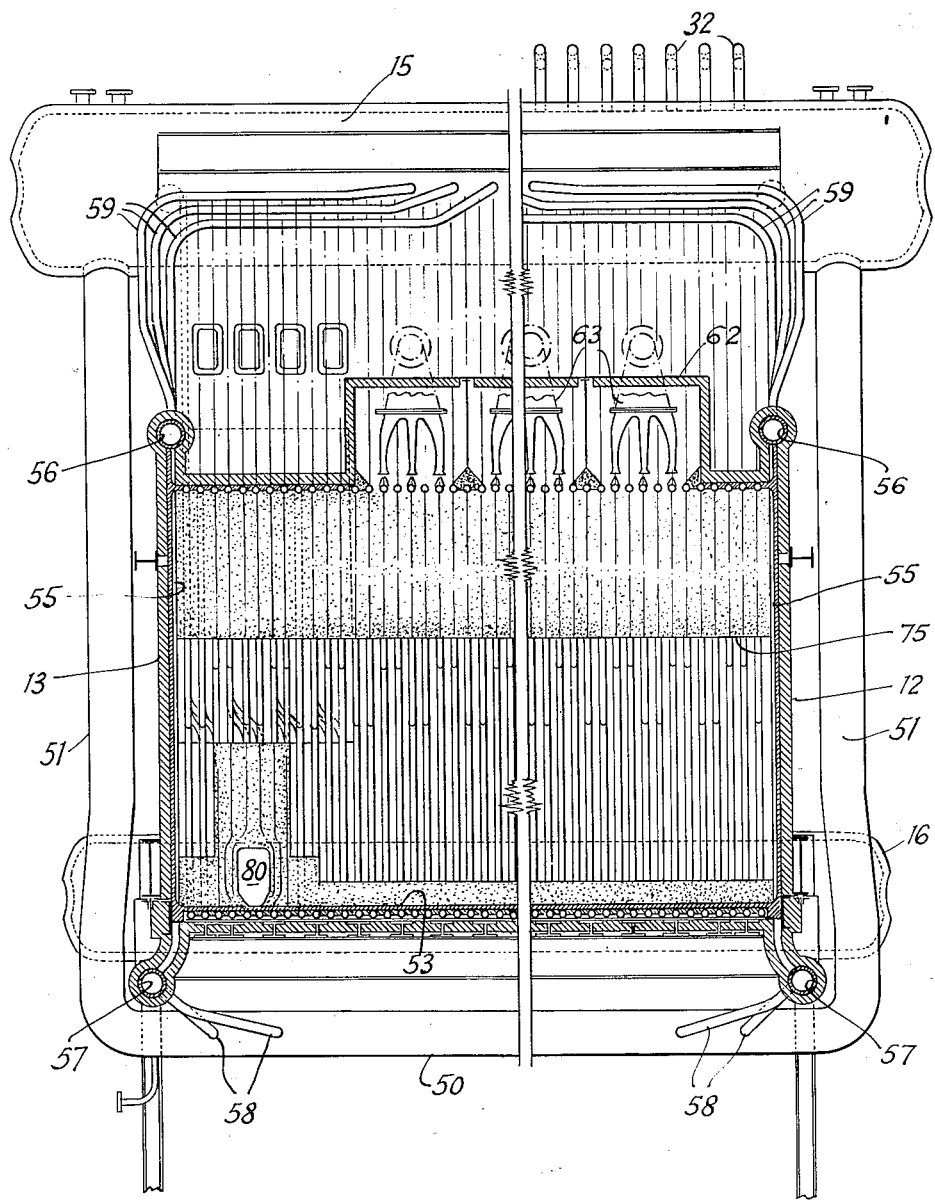
Fig. 4 is a transverse section taken on the line 4—4 of Fig. 1.

As shown in Figs. 1, 2 and 4, a considerable portion of the furnace chamber roof is broken away to form a series of burner ports 60, through which pulverized fuel may be introduced downwardly into the furnace chamber 42. The burner ports 60 are arranged side-by-side and nearer to the side wall 12 than to the side wall 13. Combustion air is supplied to the burner ports through independently controllable sections of an air supply chamber or wind box 62 extending over the burner ports. Pulverized fuel burners 63, preferably of the multiple outlet type, are arranged to discharge downwardly against the subjacent tube portions extending across the burner ports, causing a further subdivision of the entering fuel and intimate mixing with the combustion air supplied to the burner ports.

The front wall of the open pass 40 is defined by a water cooled partition 65 extending vertically from the rear end of the furnace chamber floor 53 and laterally at its upper end to the drum 15. The partition 65 is formed by a row of partly studded tubes 66 and refractory, the tubes being connected to the header 50 and the drum 15. The upper intermediate portion of the partition along the side wall 13 is omitted to form a vertically elongated opening 68, providing the only gas flow connection between the open passes 40 and 41. The portions of the tubes 66 across the opening 68 are bent into alignment, as shown in Figs. 2, 3, and 5, to reduce the pressure drop therethrough, and to form spaced slag collecting surfaces at the entrance to the open pass 40. The bottom of the open pass 40 is formed by a relatively deep ash pit 69 from which the collected residue can be removed in any suitable manner.

The partition 65 also forms the rear wall of the open pass 41, the front wall of which is formed by a depending water cooled partition 75. The partition 75 is cooled by a row of water tubes 76 extending upwardly from the header 50 at the front side of the tubes 66. The major portion of the tube row 76 have their lower portions bare and bent forwardly in staggered pairs, as shown in Figs. 1 and 5, across the bottom of the open pass 41, forming a tube screen across the bottom of the open pass. The staggered portions of the tubes 76 are again brought into alignment at the upper forward end of the tube screen, and provided with metallic studs and refractory to form the partition 75. The partition 75 extends the entire length of the unit. A vertically elongated slag outlet opening 80 is formed in the partition 65 at the floor level of the furnace chamber, the corresponding portions of the tubes 76 and 66 being bent around the opening to provide a water cooled perimeter therefor. The vertical portions of the tubes 76 immediately above the floor level of the furnace chamber are provided with studs and refractory to thicken the lower part of the partition 65, particularly the portion surrounding and above the slag opening 80.

In the operation of the steam generator described, a pulverized slag-forming fuel is introduced with the desired amount of combustion air through one or more of the burner ports in the inclined roof of the furnace chamber 42, and ignited in any suitable manner. Combustion proceeds in the water cooled furnace chamber as the fuel passes downwardly therein at a rate sufficient to maintain a normal mean furnace temperature above the fusion temperature of the ash in the fuel, causing the release of the ash constituents in a molten condition. The slag collects on the furnace chamber floor 53 and flows through the slag opening 80, in to the pit 69.

The descending stream of burning fuel and gaseous products of combustion turns upwardly immediately above the furnace chamber floor 53, in which zone the most intense combustion occurs, facilitating the discharge of slag from the furnace chamber. The stream then passes upwardly across the inclined tube screen into the open pass 41. Due to the supplementary mixing action of the screen tubes 76, combustion will be completed in the lower part of the open pass 41, and any slag released therein or carried therein by the gases tends to flow downwardly on the water cooled walls of that chamber to the furnace chamber floor 53. All of the gaseous products of combustion must then flow upwardly and longitudinally in the open pass 41 to the gas outlet 68, through which they enter the second open pass 40, and flow substantially horizontally along the length thereof to the entrance end of the convection pass 19. The horizontal gas flow path is continued through the passes 19, 20 and 21 and upwardly in the pass 21, to the gas outlet duct 35. Due to the complete water cooling of the furnace chamber and open passes 41 and 40, the temperature of the gaseous products of combustion is rapidly reduced mainly by radiation to the surrounding steam generating surface, and the gases entering the gas pass 19 will be at a temperature at which they may safely contact with the steam superheating surface while producing the desired superheat temperature. In view of the elongated path of gas flow through the relatively narrow open passes 41 and 40, any ash or slag particles remaining in suspension in the heating gases have ample opportunity to separate from the gas stream in the open pass 40 and drop into the ash pit 69, where they are removed with the slag discharged from the slag hole 80. The relative arrangement of the various partitions and gas flow openings causes a heating gas flow along virtually all of the water cooled surface without any short-circuiting. The combination of an entirely water cooled furnace chamber and plurality of serially connected water cooled open passes with a convection heated boiler section of the character described provides a maximum of steam generating surface in a minimum of space, and permits the installation of a steam generating unit of large capacity per unit of space occupied, while burning a slag-forming fuel at high rates of heat release without danger of fouling the steam generating and superheating surface.

While in accordance with the provisions of the statutes we have illustrated and described herein the best form of the invention now known to us, those skilled in the art will understand that changes may be made in the form of the apparatus disclosed without departing from the spirit of the invention covered by the claims, and that certain features of the invention may sometimes be used to advantage without a corresponding use of other features.

We claim:

1. A steam generator comprising a setting including a vertically disposed bank of generating tubes along one side thereof, baffle means dividing the space occupied by said tube bank into a plurality of serially connected passes for a substantially horizontal gas flow therethrough, the gas pass at one end of said space opening to the remaining part of said setting, a plurality of vertically disposed laterally spaced fluid cooled partitions arranged to divide said remaining part of the setting into a furnace chamber and a plurality of serially connected vertical open passes connecting said furnace chamber to said gas pass mainly at one end of said tube bank space, said open passes being connected to said furnace chamber and each other so as to provide a diagonally upward gas flow in one open pass and a substantially horizontal gas flow in a second open pass, and means for burning fuel in said furnace chamber.

2. A steam generator comprising a setting including a vertically disposed bank of generating tubes along one side thereof, baffle means dividing the space occupied by said tube bank into a plurality of serially connected passes for a substantially horizontal gas flow therethrough, the gas pass at one end of said space opening to the remaining part of said setting, a plurality of vertically disposed laterally spaced fluid cooled partitions arranged to divide said remaining part of the setting into a furnace chamber and a plurality of serially connected vertical open passes connecting said furnace chamber to said gas pass mainly at one end of said tube bank space, said furnace chamber opening to the bottom of the adjoining open pass substantially throughout its length, the open pass adjoining said tube bank space being constructed for a substantially horizontal gas flow therethrough, and means for burning fuel in suspension in said furnace chamber.

3. A steam generator comprising a setting including a vertically disposed bank of generating tubes along one side thereof, a plurality of vertically disposed laterally spaced fluid cooled partitions arranged to divide the remaining part of the setting into a furnace chamber and a plurality of serially connected vertical open passes connecting said furnace chamber to said tube bank space, said furnace chamber opening to the bottom of the adjoining open pass substantially throughout its length, the open pass adjoining said tube bank space being constructed for a substantially horizontal gas flow therethrough, and means for burning fuel in said furnace chamber.

4. A steam generator comprising a setting including a vertically disposed bank of generating tubes along one side thereof, baffle means arranged to define a gas inlet at only one end of the space containing said tube bank, a plurality of vertically disposed laterally spaced fluid cooled partitions arranged to divide the remaining part of the setting into a furnace chamber and a plurality of serially connected vertical open passes connecting said furnace chamber to said tube bank space, and means for burning fuel in said furnace chamber, said furnace chamber opening to the bottom of the adjoining open pass substantially throughout its length, and the open pass adjoining said tube bank space receiving heating gases mainly at its end opposite the connection thereof to said tube bank space.

5. A steam generator comprising a setting including a vertically disposed bank of generating tubes along one side thereof, baffle means dividing the space occupied by said tube bank into a plurality of serially connected passes for a substantially horizontal gas flow therethrough, the gas pass at one end of said space opening to the remaining part of said setting, a plurality of vertically disposed laterally spaced fluid cooled partitions arranged to divide said remaining part of the setting into a furnace chamber and a plurality of serially connected vertical open passes connecting said furnace chamber to said gas pass at one end of said tube bank space, means for burning fuel in said furnace chamber, said furnace chamber opening to the bottom of the adjoining open pass substantially throughout its length, and the open pass adjoining said tube bank space receiving heating gases only at its end opposite the connection thereof to said tube bank gas pass.

6. A steam generator comprising a setting including a vertically disposed bank of generating tubes along one side thereof, means arranged to provide a gas flow longitudinally of the space occupied by said tube bank, a plurality of vertically disposed laterally spaced fluid cooled partitions arranged to divide the remaining part of the setting into a furnace chamber and a pair of serially connected vertical open passes connecting said furnace chamber to said tube bank space, means for downwardly introducing and burning fuel in suspension in said furnace chamber, said furnace chamber opening to the bottom of the adjoining open pass substantially throughout its length, and the other open pass being arranged to receive heating gases mainly at its end opposite the connection thereof to said tube bank space and providing a substantially horizontal gas flow therethrough.

7. A steam generator comprising a setting including a vertically disposed bank of generating tubes along one side thereof, means arranged to provide a gas flow longitudinally of the space occupied by said tube bank, a plurality of vertically disposed laterally spaced fluid cooled partitions arranged to divide the remaining part of the setting into a furnace chamber and a pair of serially connected vertical open passes connecting said furnace chamber to said tube bank space, means for introducing and burning a slag-forming fuel in suspension in said furnace chamber, said furnace chamber opening to the bottom of the adjoining open pass, a closed slag-receiving floor for said furnace chamber, a slag discharge opening in one of said partitions at the level of said furnace chamber floor, a slag pit below the other open pass and arranged to receive slag from said slag discharge opening, and said other open pass being arranged to receive heating gases mainly at its end opposite the connection thereof to said tube bank space and providing a substantially horizontal gas flow therethrough.

8. A steam generator comprising a setting including a vertically disposed bank of generating tubes along one side thereof, means arranged to provide a gas flow longitudinally of the space occupied by said tube bank, a plurality of vertically disposed laterally spaced fluid cooled partitions arranged to divide the remaining part of the setting into a furnace chamber and a pair of serially connected vertical open passes connecting said furnace chamber to said tube bank space, means for downwardly introducing and burning a slag-forming fuel in suspension in said furnace chamber, said furnace chamber opening to the bottom of the adjoining open pass substantially throughout its length, a slag-receiving floor for said furnace chamber, and said other open pass being constructed to receive heating gases only at its end opposite the connection thereof to said tube bank space and providing a substantially horizontal gas flow therethrough.

9. A steam generator comprising a setting including a vertically disposed bank of generating tubes along one side thereof, means arranged to provide a substantially horizontal gas flow longitudinally of the space occupied by said tube bank, a plurality of vertically disposed laterally spaced fluid cooled partitions arranged to divide the remaining part of the setting into a furnace chamber and a pair of serially connected vertical open passes connecting said furnace chamber to said tube bank space, means for downwardly introducing and burning a slag-forming fuel in suspension in said furnace chamber, said furnace chamber opening to the bottom of the adjoining open pass substantially throughout its length, a closed slag-receiving floor for said furnace chamber, a slag discharge opening in one of said partitions at the level of said furnace chamber floor, a slag pit below the other open pass and arranged to receive slag from said slag discharge opening, and said other open pass being arranged to receive heating gases mainly at its end opposite the connection thereof to said tube bank space and providing a substantially horizontal gas flow therethrough.

10. A steam generator comprising a setting including a furnace chamber and a convection section spaced laterally from the furnace chamber, a vertically disposed substantially unobstructed connecting passage having its opposite ends connected to said furnace chamber and convection section respectively, means for burning finely divided solid fuel in suspension in said furnace chamber at a normal mean temperature therein above the fuel ash fusion temperature, a substantially closed floor forming the bottom of said chamber to receive and support slag, in molten condition, an upper steam and water drum, a lower water drum, heat absorbing surface for the walls of the furnace chamber and the walls of said passage consisting of water tubes connected at their upper ends to the steam and water drum and arranged to receive water from the water space of said drum at their lower ends, said convection section including a vertically disposed bank of steam generating tubes extending between and connected to said drums along the length thereof, the portion of said connecting passage adjoining said convection section being constructed for a substantially horizontal gas flow therethrough into one end of said convection section, an ash and slag receiving space beneath the connecting passage, and a slag flow opening through the wall of said furnace chamber to said space.

ERVIN G. BAILEY.
ARTHUR E. RAYNOR.